United States Patent [19]

Hafla et al.

[11] Patent Number: 4,843,691
[45] Date of Patent: Jul. 4, 1989

[54] LATHE

[75] Inventors: Dietmar F. Hafla, Hohengehren; Helmut Gatzki, Esslingen, both of Fed. Rep. of Germany

[73] Assignee: Index-Werke Komm.-Ges. Hahn & Tessky, Esslingen, Fed. Rep. of Germany

[21] Appl. No.: 98,305

[22] Filed: Sep. 18, 1987

[30] Foreign Application Priority Data

Oct. 3, 1986 [DE] Fed. Rep. of Germany ....... 3633639

[51] Int. Cl.⁴ .............................................. B23B 3/06
[52] U.S. Cl. ...................................... 29/36; 29/27 C; 82/159
[58] Field of Search .................... 82/2 R, 24 R, 36 A; 29/27 C, 36, 33 J, 40, 39

[56] References Cited

U.S. PATENT DOCUMENTS 4,051,750 10/1977 Berly .................................. 82/36 A
4,622,872 11/1986 Ita ...................................... 82/36 A

FOREIGN PATENT DOCUMENTS 2128642 9/1975 Fed. Rep. of Germany .

OTHER PUBLICATIONS

Sales Brochure, "GF 2×2 Achsen CNC—Drehmaschinen NDM—25—4 und NDN—40—4", by Georg Fischer Aktiengellschaft, Schaffhausen (Schweiz).
Sales Brochure, "Manurhin MA—T 65, 4—Achsen CNC—Drehmaschine", by Manurhin.
Brochure "Esslinger Ueberraschung", published in NC Report, Dec. 1982.

Primary Examiner—Frederick R. Schmidt
Assistant Examiner—Blynn Shideler
Attorney, Agent, or Firm—Kramer, Brufsky & Cifelli

[57] ABSTRACT

A lathe comprises two turrets each arranged on a compound slide system. The turrets are mounted on sides of the two compound slide systems facing each other and have indexing axes extending parallel or at a slight incline to the work spindle axis of the lathe. To reduce the danger of collisions between the two turrets and to enable the two turret bodies to be moved close together, the turret body located on the headstock side is smaller and has less stations than the other turret body with the result that the circles described by the tool cutting edges during rotation of the two turrets are smaller in the case of one turret than in the other.

11 Claims, 2 Drawing Sheets

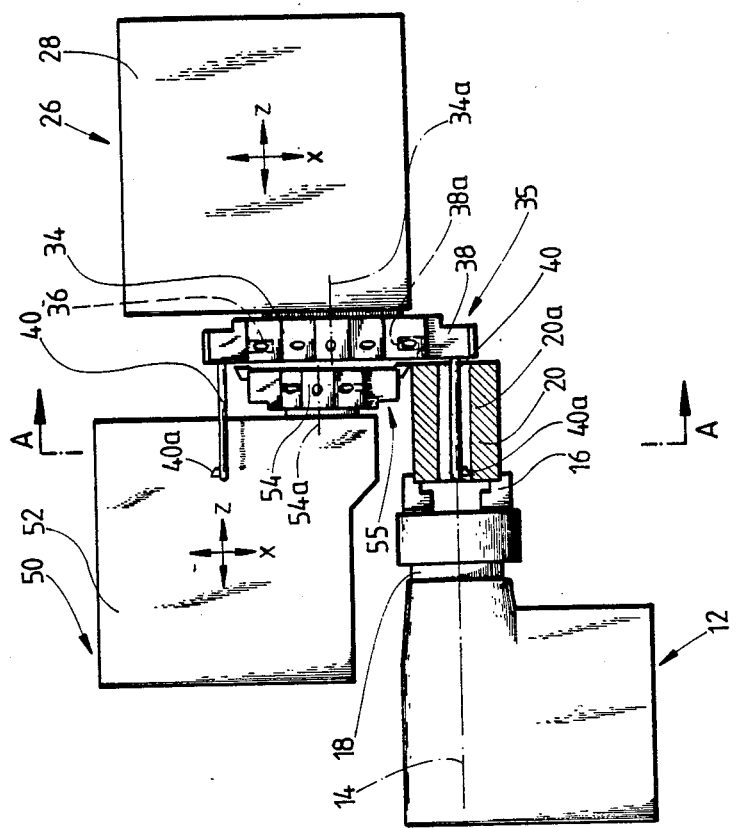
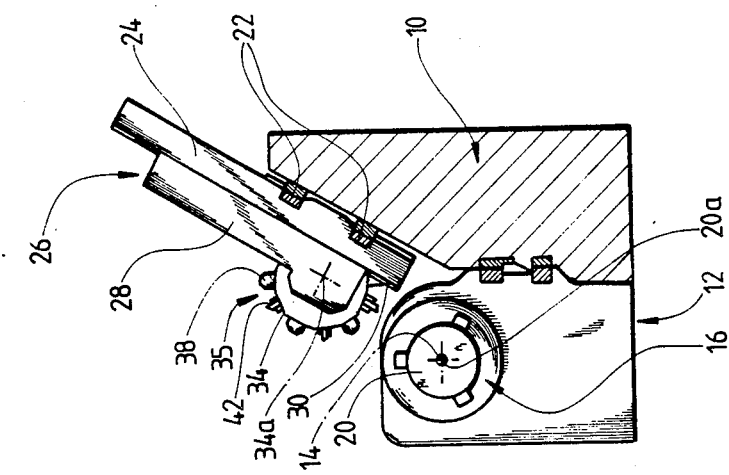

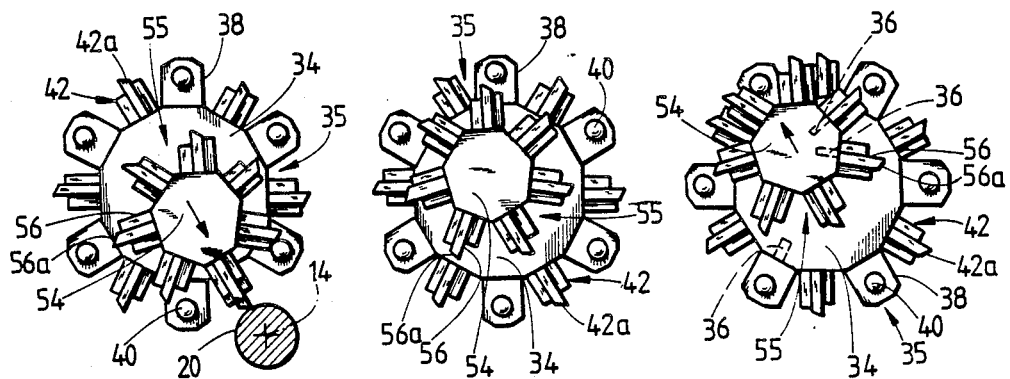
Fig. 3  Fig. 4  Fig. 5
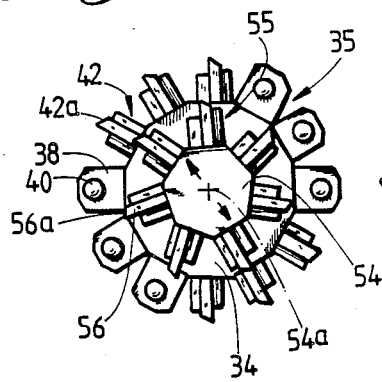
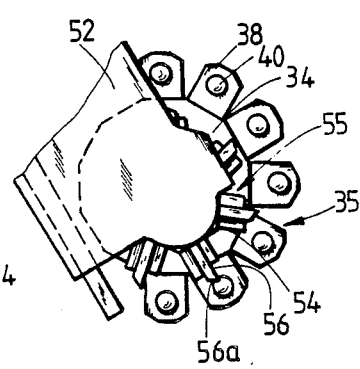
Fig. 6  Fig. 7

LATHE

The invention relates to a lathe with two turret bodies carrying tools. The turret bodies are each arranged on a compound slide system and are thus displaceable both parallel and perpendicularly to the axis of rotation of a work spindle provided with a tool clamping device relative to each other and to the workpiece clamping device. Each turret body is mounted on the associated compound slide system for rotation about an indexing axis preferably parallel to the work spindle axis and comprises in the region of its circumference several stations which can be fitted with tools. The stations of a first one of the two turret bodies are of such design that when fitted with internal machining tools, an internal machining tool in operating position will extend in the direction parallel to the work spindle axis towards the other, second turret body and towards the workpiece clamping device. Both compound slide systems are located on one and the same side of the work spindle axis, which, however, only means that the work spindle axis does not extend between the two turrets.

In such known slant-bed lathes (for example, NDM-25-4 and NDM-40-4 models of Georg Fischer Aktiengesellschaft, Schaffhausen, Switzerland) in which the bed for the two compound slide systems is arranged behind the work spindle axis and is rearwardly inclined by approximately 20 degrees relative to the vertical, turret bodies which are of identical design or of mirror-image identical design relative to a center plane between the two turrets and perpendicularly to their indexing axes are normally used to simplify manufacture. Use of turret bodies of identical diameter does, however, result in a serious disadvantage of this known construction: The first turret body normally located further from the work spindle will, as a rule, carry at least one internal machining tool in the form of a drill or a boring bar, in most cases, several such internal machining tools which extend in the direction towards the other, second turret body and towards the workpiece held by the workpiece clamping device. In the known lathes of the kind described at the beginning with turret bodies of identical size, the danger of the internal machining tools carried by the first turret body colliding with the second turret body or tools carried by it and toolholders is extremely great. Hence it is, for example, not possible to drill a deep hole with a long drill or a long boring bar if the first turret body is carrying a second long internal machining tool in approximately diametrically opposed relation to this internal machining tool unless the second turret body can be moved back in the direction of the work spindle axis far behind the workpiece clamping device, which, however, is often not possible or should be avoided for time reasons as it is then not possible to carry out operations with external machining tools carried by the second turret body during the drilling. A further disadvantage of the described known construction is that the turret bodies cannot be moved close together without mutually hindering each other as the length of the longest internal machining tool carried by the first turret body determines the minimum spacing of the two turret bodies from each other.

The object underlying the invention was to eliminate the above explained disadvantages and to provide a lathe of the kind mentioned at the beginning in which the danger of the two turrets colliding can be drastically reduced by appropriate fitting with tools.

This object is achieved, in accordance with the invention, by the two turrets being of such dimensions with respect to their indexing axis in the radial direction relative to each other that by displacement of the second turret parallel to the work spindle axis, the largest imagined body described during rotation of the second turret body through 360 degrees about its indexing axis by the cutting edges of the tools of this turret can be moved into the smallest imagined body described during rotation of the first turret body through 360 degrees about its indexing axis by the cutting edges of the internal machining tools held by this turret. For this purpose, the diameter of the first turret body, in a preferred embodiment of the inventive lathe, is larger than that of the second turret body. In principle, however, the invention is also realizable with turret bodies of identical size if by means of appropriate arrangement of the fixtures for the tools or the toolholders and/or by appropriate design of the toolholders, the internal diameters of the bodies described by the internal machining tools carried by the first turret body during rotation of the first turret body are larger than the diameter of the circles described by the cutting edges of the external machining tools of the second turret body when it is rotated through 360 degrees about its indexing axis.

It is already known in 4-axis lathes with turret indexing axes which, in a front view, extend at 45 degrees to the work spindle axis ( MA-T 65 lathe of Manurhin-Automatic S.A., 68059 Mulhouse, France ) to enable the two turrets to be brought close together in a collision-free manner by the internal machining tools held by the second turret body in the form of a crown turret remote from the headstock describing during rotation of this turret through 360 degrees a cone with an apex angle of 90 degrees whose largest diameter is larger than the diameter of the circle described by the cutting edges of the external machining tools of the other turret when it is rotated through 360 degrees. However, since the two turret bodies of this known lathe are identical with respect to diameter and number of stations, this prior art fails to suggest a solution for achievement of the set object in lathes in which the turret indexing axes extend approximately parallel to the work spindle axis for in the case of turret bodies with identical diameters and stations, the internal machining tools then prevent close approach of the two turret bodies in a collision-free manner.

On account of the normally required minimum spacing of the tools of a turret in the circumferential direction, the number of stations of the second turret body which can be fitted with external machining tools, in a preferred embodiment of the inventive lathe, is smaller than the number of stations of the first turret body which can be fitted with internal machining tools.

The inventive lathe will normally be a so-called 4-axis machine, but it is, of course, also possible to fit the inventive lathe with more than two turrets. Nor do the indexing axes of the two turrets have to be exactly parallel to the work spindle axis. They could include a small acute angle with the direction of the work spindle axis as the above explained problems may also occur with such so-called crown turrets where the axes of the internal machining tools form a cone with a very small apex angle and the indexing axis as cone axis, and, therefore, only an internal machining tool in operating position extends exactly parallel to the work spindle axis.

In accordance with another inventive concept for achievement of the object, the two turret bodies are of such design that they are positionable relative to each other by indexing and by displacement in the direction of the work spindle axis and also perpendicularly to it such that—viewed in the direction of the indexing axes—an external machining tool of the second turret body in operating position extends through the space between two internal machining tools of the first turret body and/or an internal machining tool of the first turret body extends through the space between two external machining tools of the second turret body. This principle is preferably used in combination with the above explained inventive concepts but, basically, it also enables achievement of the set object in the case of turret bodies of identical size by the internal machining tools of the first turret body being able to extend in the axial direction through the space between the external machining tools of the second turret body, which is achieved by the rows of tools of the two turret bodies being correspondingly offset relative to each other with respect to the indexing angle.

The danger of collision is reduced in a particularly advantageous way by one turret body having an even and the other turret body an uneven number of indexing positions and hence stations.

Finally, attention is called to a particularly advantageous design and fitting of an inventive lathe: If the two turret bodies are of such dimensions in the radial direction relative to each other that the second turret body fitted all around with external machining tools is displaceable perpendicularly to the work spindle axis through the space between two diametrically opposed internal machining tools of the first turret body, displacement of the second turret body perpendicularly to the work spindle axis is then in no way restricted and, as a rule, even if the first turret body is carrying not only two diametrically opposed groups of internal machining tools, with each of these comprising two or even three such tools.

Further features, advantages and details of the invention are apparent from the following description and the appended drawings of a particularly advantageous embodiment of the lathe according to the invention. In the drawings:

FIG. 1 is a vertical sectional view taken perpendicularly to the work spindle axis through the bed of a 4-axis slant-bed lathe, viewed in the direction towards the so-called headstock;

FIG. 2 is a schematic front view of the headstock and the two top slides of the two compound slide systems carrying the two turrets, viewed in the direction perpendicular to the work spindle axis; and FIGS. 3 to 7 are schematic front end and rear end views corresponding to line A—A in FIG. 2 of the two turret bodies fitted with tools in various positions of the turret bodies relative to each other, with a workpiece which is just undergoing external machining indicated in FIG. 3.

The lathe shown in FIGS. 1 and 2 comprises a machine bed 10 with a headstock 12 mounted thereon. The headstock serves as bearing for a work spindle 18 which is rotatable about a horizontal axis 14 and is provided with a chuck 16. It also accommodates a drive motor, not illustrated, for the work spindle. A workpiece held by chuck 16 is designated by 20.

Attached to the machine bed 10 are two guideways 22 which extend in the direction of the so-called Z axis, i.e., parallel to the work spindle axis 14, and serve to guide two bottom slides, only one of which is shown in FIG. 1, namely bottom slide 24. It is part of a compound slide system 26 which includes a top slide 28 guided on the bottom slide 24 in the direction of the so-called X axis, i.e., perpendicularly to the work spindle axis 14. Guideways 30 for guiding the top slide are attached to the bottom slide 24. Accordingly, as indicated by double arrows in FIG. 2, the top slide 28 is displaceable both in the direction of the Z axis and in the direction of the X axis, more particularly, by drives, not illustrated, for the bottom slide 24 and the top slide 28.

Mounted for rotation on the top slide 28 about an indexing axis 34a extending parallel to the work spindle axis 14 and hence to the Z axis, is a first turret body 34 of a first turret which, including its tools and toolholders, is designated by 35. The turret body 34 can be rotated about the indexing axis 34a in a numerically controlled manner by drive means, not illustrated, and can be immobilized in rotary angular positions specified by the machine control system. It is provided, for example, on its circumference with several tool holes 36 which may, for example, be in the form of radial bores, with each of these defining an indexing station of the turret body 34. In the illustrated embodiment, the first turret body 34 has twelve such stations, as is apparent from FIGS. 3 to 7. Toolholders 38 provided, for example, with a shank 38a are insertable into these tool holes for an internal machining tool 40 which may, for example, be a drill or a boring bar with a cutting edge 40a. It is, however, also conceivable to use a tap, a milling cutter or the like. The construction is such that by displacement of the top slide 28 in the direction of the X axis and by rotation of the first turret body 34 about its indexing axis 34a, each of the internal machining tools 40 is brought into a position in which its axis is in alignment with the work spindle axis 14 and hence, for example, a longitudinal bore 20a can be made in workpiece 20. As is apparent from FIGS. 3 to 6, the first turret body 34 can be fitted not only with internal machining tools 40 but also with external machining tools 42 which have cutting edges designated by 42a and are carried by appropriate toolholders.

The lathe comprises a second compound slide system 50, of which only the top slide 52 is illustrated in the drawings, more particularly, in FIG. 2. The bottom slide carrying this top slide should, in the illustrated embodiment, be seated on the same guideways 22 as the bottom slide 24 of the first compound slide system 26 and it should carry on its upper side guideways corresponding to guideways 30 and likewise extending in the direction of the X axis for displacement of the top slide 52 along these. The two compound slide systems may be of mirror-image identical design, more particularly, in mirror image with respect to a plane extending between the two compound slide systems and perpendicularly to the work spindle axis 14. While the first turret body 34 is arranged on the side of the top slide 28 facing the headstock 12, the top slide 52 carries on its side facing away from the headstock 12 a second turret body 54 of a turret which, including its tools and toolholders, is designated by 55. The second turret body 54 is held on the top slide 52 for rotation about an indexing axis 54a. In this case, too, the drive means for displacement of the bottom slide in the direction of the Z axis, displacement of the top slide 52 in the direction of the X axis and rotation and setting of the second turret body 54 are not illustrated as such drive means are well known in the prior art. In the illustrated embodiment, the second turret body 54 carries on its circumference seven external machining tools 56 whose cutting edges are designated by 56a. Hence the second turret body 54 comprises seven indexing stations defined by tool holes which correspond to the tool holes 36 of the first turret body 34 but could also be of different design.

Accordingly, the two turret bodies 34 and 54 face each other.

As is clearly apparent from FIG. 2, the second turret body 54 is of such dimensions with respect to the first turret body 34 that it can be moved in between the internal machining tools 40 carried by the first turret body 34, and, in the illustrated case, in accordance with the invention, the largest external diameter of the second turret body 54 is smaller than the internal diameter of the body described by the internal machining tools 40 when the first turret body 34 is rotated through 360 degrees about its indexing axis 34a. However, as is apparent from FIGS. 2 and 5, which belong to each other, drilling and turning can even be performed simultaneously with the inventive machine by the drilling being carried out with an internal machining tool 40 carried by the first turret body 34 and the turning, for example, on the external circumference of workpiece 20 with an external machining tool 56 carried by the second turret body 54. In this case, it is particularly advantageous that, in accordance with the invention, the second turret body 54 is not only smaller than the first turret body 34 and has less stations, but that the rows of station of the two turret bodies are offset relative to one another, thereby enabling the internal machining tool 40 of the first turret body 34 shown in the top left-hand corner of FIG. 5 to extend through the space between two external machining tools 56 of the second turret body 54.

FIG. 3 shows the first turret body 34 fitted in such a way that operations can be carried out simultaneously with an external machining tool 42 of the first turret body 34 and with an external machining tool 56 of the second turret body 54. FIG. 3 shows the lowermost position of the second turret body 54 while FIG. 4 illustrates the uppermost position of the second turret body 54 (always on the condition, of course, that the two turret bodies have been brought together in the direction of the Z axis such that collisions could actually occur). As a comparison of FIGS. 4 and 5 shows, the second turret body 54 can be moved upwardly even further in the direction of the X axis if the turret body 34 is indexed one station further, namely into a position in which one of its internal machining tools 40 extends in the axial direction through the space between two external machining tools 56 of the second turret body 54. Therefore, FIG. 5 shows the uppermost possible position of the second turret body 54, with the first turret body 34 fitted as illustrated in FIGS. 3 to 5.

If the first turret body 34 is fitted with only two diametrically opposed groups of internal machining tools 40, with each group comprising only one or two, but at the most three internal machining tools, then in the indexed position of the first turret body 34 shown in FIG. 6, the second turret body 54 can be freely reciprocated in both directions of the X axis, i.e., its displacement is not restricted by the first turret body 34 and its tools.

However, as is also apparent from FIG. 7, collisions between the two turrets are even avoidable when the first turret body 34 is completely or substantially fitted with internal machining tools 40.

Of course, the tool holes do not have to be provided on the circumference of the two turret bodies but instead could be arranged on the end faces (naturally near the external circumference). Tool holes could also be provided on both the end faces and the circumference of the turret bodies. In this connection, it is merely a question of the position of the tools and the tool cutting edges.

In accordance with the invention, the number of stations on the turret body used for internal machining is, however, preferably as large as possible, the number of stations on the second turret body substantially less and, preferably, the first turret body comprises 10, 12 or up to 16 or more stations, and the second turret then only 5, 7 or 9, respectively, or correspondingly more stations.

What is claimed is:

1. A lathe comprising:
    a work spindle having a workpiece clamping device and being drivable about and axis of rotation;
    two compound slide systems, each comprising a bottom slide and a top slide;
    guide means extending parallel to the work spindle axis for guiding both bottom slides located on one side of said work spindle axis; and
    two turret bodies carrying tools; and wherein
    said turret bodies are each arranged on one of said two top slides and thus are displaceable both parallel and perpendicularly to said work spindle axis relative to said respective other turret body and to said workpiece clamping device;
    said turret bodies are each mounted on said associated compound slide system for rotation about an indexing axis oriented at least approximately in the same direction as said work spindle axis;
    said turret bodies each comprise in the region of their circumference several stations which can be fitted with tools;
    the stations of a first one of said two turret bodies are of such design that when fitted with internal machining tools, an internal machining tool in operating position will extend in the direction parallel to said work spindle axis towards said other, second turret body, and the tools of said first and second turret bodies are operable simultaneously on said work spindle while said second turret body is located within said smallest imagined body described during rotation of said first turret body and towards said workpiece clamping device; and
    said two turret bodies are of such dimensions with respect to their indexing axes in the radial direction relative to each other that by displacement of said second turret body by the associated compound slide system parallel to said work spindle axis the largest imagined body described during rotation of said second turret body through 360 degrees about its indexing axis by cutting edges of said tools of said second turret body can be moved into the smallest imagined body described during rotation of said first turret body through 360 degrees about its indexing axis by cutting edges of said internal machining tools held by said first turret body.

2. A lathe as defined in claim 1, wherein:
    the number of positions into which one of said turret bodies can be indexed by rotation of said turret body about its indexing axis is an uneven number and the number of positions into which the other turret body can be indexed by rotation about its indexing axis is an even number.

3. A lathe as defined in claim 2, wherein:
the diameter of said first turret body is larger than that of said second turret body.

4. A lathe as defined in claim 1, wherein:
said two turret bodies are positionable relative to each other by indexing and by displacement in the direction of said work spindle axis and also perpendicularly thereto such that—viewed in the direction of said indexing axes—an external machining tool of said second turret body extends in operating position through the space between two internal machining tools of said first turret body and/or an internal machining tool of said first turret body extends through the space between two external machining tools of said second turret body.

5. A lathe as defined in claim 4, wherein:
said first turret body includes a multiplicity of internal machining tools evenly spaced around the periphery of said first turret body;
the largest body defined by the cutting edges of the tools of said second turret body during rotation of the second turret body is greater than the spacing between adjacent ones of said internal machining tools; and
said external machining tool operates through the space between two adjacent ones of said internal machining tools.

6. A lathe as defined in claim 1, wherein:
said two bottom slides are arranged and guided on a common guide extending parallel to said work spindle axis.

7. A lathe as defined in claim 1, wherein:
the diameter of said first turret body is larger than that of said second turret body.

8. A lathe as defined in claim 1, wherein:
said two turret bodies are of such dimensions in the radial direction relative to each other that said second turret body fitted all around with external machining tools is displaceable perpendicularly to said work spindle axis through the space between two diametrically opposed internal machining tools of said first turret body.

9. A lathe as defined in claim 1 wherein said second turret body is fitted with external machining tools, and one of said external maching tools of said second turret body is operable simultaneously with and independently of any one of said internal machining tools of said first turret body on the same length of a single workpiece.

10. A lathe as defined in claim 1 wherein said first turret body is fitted with a multiplicity of internal machining tools arranged around the periphery of said first turret body generally parallel to each other and the axis of said work spindle, and said second turret body is movable into a center space defined by said multiplicity of internal machining tools.

11. A lathe comprising:
a work spindle having a workpiece clamping device and being drivable about an axis of rotation;
two compound slide systems, each comprising a bottom slide and a top slide, each of said top slides being mounted on the corresponding bottom slide for independent movement substantially perpendicular to the work spindle axis;
a guide common to and supporting both bottom slides and extending parallel to the work spindle axis for guiding both bottom slides parallel to the work spindle axis, both of said bottom slides being located on one side of said work spindle axis; and
first and second turret bodies carrying tools; and wherein
said turret bodies are each supported on one of said two top slides and displaceable both parallel and perpendicular to said work spindle axis relative to the other turret body and to said workpiece clamping device;
said turret bodies are each mounted on the associated compound slide system for rotation about an indexing axis oriented at least approximately in the same direction as said work spindle axis;
said turret bodies each comprise in the region of their circumference several stations which can be fitted with said tools;
the stations of said first turret body are of such design that when fitted with internal machining tools, an internal machining tool in operating position will extend in the direction parallel to said work spindle axis towards said second turret body and towards said workpiece clamping device; and
said first and second turret bodies are of such dimensions with respect to their indexing axes in the radial direction relative to each other that by movement of said second turret body by the associated compound slide system adjacent to said first turret body during a cutting operation, the largest imagined body described during rotation of said second turret body through 360 degrees about its indexing axis by cutting edges of said tools of said second turret body fits into the smallest imagined body described during rotation of said first turret body through 360 degrees about its indexing axis by said internal machining tools held by said first turret body, and the tools of said first and second turret bodies are operable simultaneously on said work spindle while said second turret body is located within said smallest imagined body described during rotation of said first turret body.

* * * * *